(No Model.)
J. D. PRESCOTT.
ELASTIC METALLIC TIRE.
No. 560,173. Patented May 12, 1896.
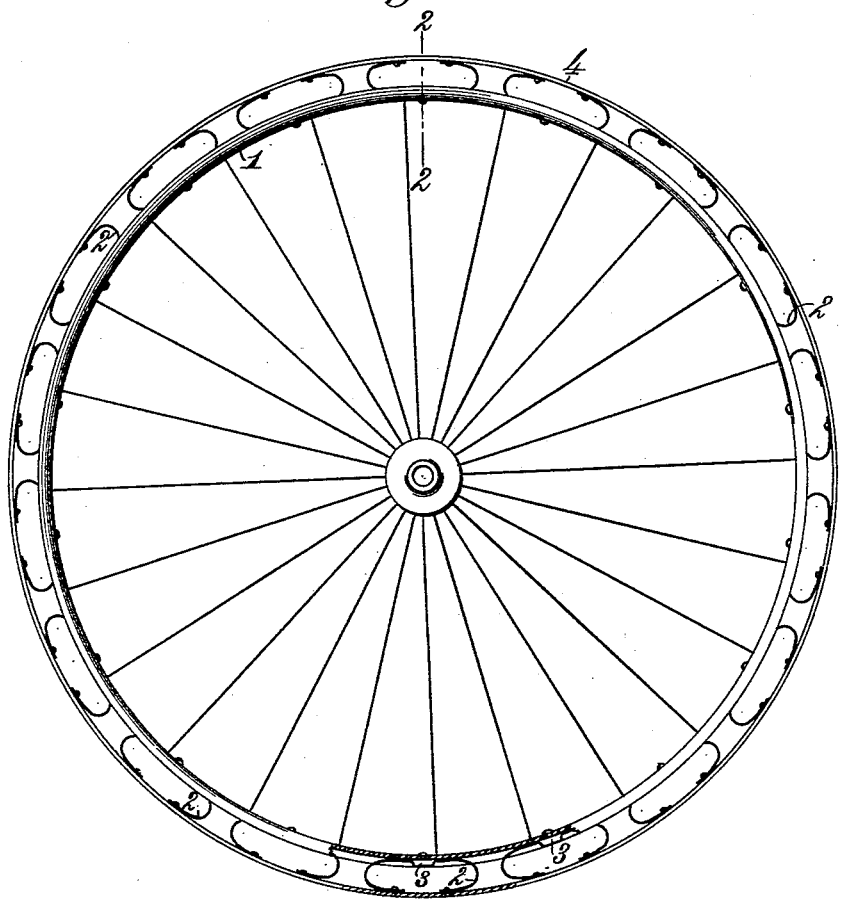
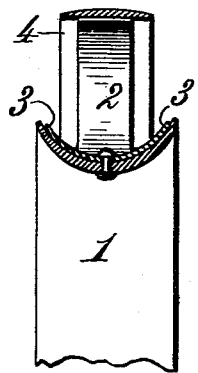
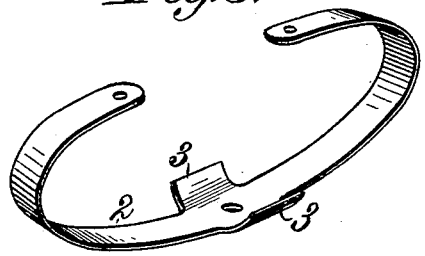
Witnesses.
Inventor.
Joseph D. Prescott.
By James L. Norris.
Atty.

UNITED STATES PATENT OFFICE.

JOSEPH D. PRESCOTT, OF BOSTON, MASSACHUSETTS.

ELASTIC METALLIC TIRE.

SPECIFICATION forming part of Letters Patent No. 560,173, dated May 12, 1896.

Application filed July 13, 1895. Serial No. 555,886. (No model.)

*To all whom it may concern:*

Be it known that I, JOSEPH D. PRESCOTT, a citizen of the United States, residing at Boston, in the county of Suffolk and State of Massachusetts, have invented new and useful Improvements in Elastic Metallic Tires for Bicycles and other Vehicles, of which the following is a specification.

My invention relates to elastic metallic tires for bicycles and other vehicles, my purpose being to provide a complete and efficient substitute for the pneumatic tires and elastic cushion-tires of rubber now in common use.

It is one purpose of my invention to provide an all-metal tire which shall possess all the elasticity of the best pneumatic tires, together with the advantages resulting from the employment of metal in place of a soft and easily-punctured substance like rubber, but without sensibly increasing the weight of the wheel as compared with one of like diameter and construction equipped with either the rubber cushion-tire or the inflated pneumatic tire.

My invention consists, to these ends, in an elastic all-metal tire for bicycles and other vehicles, consisting of a series of independent elastic members arranged in the longitudinal plane of the perimeter of the wheel and having their disconnected ends secured to an elastic peripheral plate which forms the tread of the tire, the central portions being concaved and widened to fit the circumferential channel in the rim, to which they are fastened.

My said invention consists in certain novel features of construction and in the parts and new combinations of parts hereinafter fully explained, and then particularly pointed and defined in the claim which concludes this specification.

To enable others to fully understand and to practice my said invention, I will now proceed to explain the same in detail, reference being had to the accompanying drawings, in which—

Figure 1 is a side elevation, partly in section, of a wheel in which my invention is incorporated. Fig. 2 is a transverse section, upon an enlarged scale, showing a portion of the wheel on line 2 2, Fig. 1. Fig. 3 is a view in perspective, showing one of the elastic supports.

The reference-numeral 1 indicates the rim of a wheel of an ordinary bicycle, which may be constructed of wood or other suitable material in the manner seen in bicycles having pneumatic tires. I prefer, however, to construct this rim in one piece from any suitable metal and to slightly modify it in shape and width to accommodate it to my invention. When thus constructed, the rim will be channeled, but not as deeply as the wheels equipped with inflated rubber tires.

Within the channel in the rim 1 I arrange a series of independent elastic supports for the tread of the wheel, each consisting of a strip of metal of high elasticity, such as steel, bent into approximately elliptical or ellipsoidal form, but having its ends separated by a suitable interval. The central portion of each strip is preferably widened somewhat and the marginal portions are curved upward to conform to the concavity of the channel in the rim. These strips 2 are placed upon the rim in the longitudinal line of the channel, so that the separated ends lie in the same plane with the wheel. The central concave portion fits within the channel in the rim and the laterally-extended marginal portions 3 are attached to the same by means of rivets, screws, or other suitable means.

The supporting-strips 2 are placed as closely together as is consistent with the space required for their expansion under the weight which may be placed upon the wheel. A light band 4, of very elastic metal, is then drawn around the wheel, its flat inner face resting upon the separated extremities of the series of supports 2, said extremities being attached to the band 4 by rivets or otherwise. The outer face of the band is preferably convex in cross-section. This band forms the tread of the wheel and is so light and elastic that the yielding support is practically thrown upon the interposed strips 2. The band is formed and its ends welded before it is placed upon the wheel. Its diameter is such that when it is in place the band will compress the elastic supports 2 somewhat, thereby pressing a portion of each, on each side of the central rivet, against the rim. This gives these elastic strips an ample base of support upon the rim and will aid in preventing lateral displacement.

The form and dimensions of the elastic strips 2 may be varied as circumstances may require, and the invention may be applied to bicycles having the channeled wooden or metallic rims now used in combination with pneumatic tires. I may also face the band 4 on the outside with rubber or any other suitable material, but ordinarily the exposed metallic surface will answer every purpose. If desired, however, this surface may be roughened to give it suitable frictional contact or hold upon the ground or pavement.

In metallic tires having elastic supports arranged transversely to the rim of the wheel and connected to a surrounding elastic band it has been found that the travel of the wheel under a load produces a tendency in the tire to creep around the rim, thereby causing the band to draw the transverse supports in one direction or the other at the risk of rupturing their fastening. By arranging the elastic supports longitudinally and connecting their separated ends to the band 4 in the manner shown I avoid this objection and provide an all-metal tire which will not exceed the common pneumatic tire in weight, will cost less, will be equally elastic and serviceable, and far more durable.

Heretofore and prior to my invention wheels have been proposed having a metallic band and a series of independent spring-strips interposed between said band and the rim of the wheel, and I make no claim, broadly, to such an invention. My improvement differs from these by widening and concaving the middle portion of each elastic strip in such manner that it may enter and find a seat in the channel in the periphery of the rim. By fastening the widened concave portion thereto I obtain a much more secure and durable attachment and am able to provide a far better and more effective resistance to lateral strain upon the wheel. By widening the elastic strips and attaching them near their edges I impart a much greater power to resist lateral thrust, and by seating the widened middle portion of the strip in the channel in the rim of the wheel I not only add largely to this ability to resist side strain, but I greatly increase the durability of the wheel and prevent the frequent loosening of the attaching-screws and the rattling of the parts.

What I claim is—

A metallic, elastic tire for wheels having concave channels in their rims, said tire consisting of a continuous, elastic band of metal of greater diameter than the channeled rim, and a series of interposed elastic strips having widened and concaved middle portions to fit within the concave channel in the rim to which they are fastened, the ends of said strips being curved over toward each other and fastened to the inner face of the metallic band with an interval of separation between said ends, substantially as described.

In testimony whereof I have hereunto set my hand in presence of two subscribing witnesses.

JOSEPH D. PRESCOTT.

Witnesses:
JAMES L. NORRIS,
THOS. A. GREEN.